(12) United States Patent
Perryman, Jr.

(10) Patent No.: US 11,753,313 B2
(45) Date of Patent: Sep. 12, 2023

(54) RAPID EVAPORATION OF WATER FOR DESALINATION AND DEWATERING USING NANOBUBBLES AND MICRO-DROPLETS

(71) Applicant: Virgil Dewitt Perryman, Jr., Sheikh Khalifa Bin Zayed (AE)

(72) Inventor: Virgil Dewitt Perryman, Jr., Sheikh Khalifa Bin Zayed (AE)

(*) Notice: Subject to any disclaimer, the term of this patent is extended or adjusted under 35 U.S.C. 154(b) by 21 days.

(21) Appl. No.: 17/518,280

(22) Filed: Nov. 3, 2021

(65) Prior Publication Data
US 2022/0135437 A1 May 5, 2022

Related U.S. Application Data

(60) Provisional application No. 63/108,931, filed on Nov. 3, 2020.

(51) Int. Cl.
| | | |
|---|---|---|
| *B01D 1/14* | (2006.01) | |
| *C02F 1/10* | (2023.01) | |
| *B01D 53/22* | (2006.01) | |
| *B01D 71/02* | (2006.01) | |
| *B01D 53/04* | (2006.01) | |

(Continued)

(52) U.S. Cl.
CPC ............... *C02F 1/10* (2013.01); *B01D 1/14* (2013.01); *B01D 53/04* (2013.01); *B01D 53/229* (2013.01); *B01D 71/022* (2013.01); *B01F 23/231* (2022.01); *B01F 31/80* (2022.01); *B01D 2253/102* (2013.01); *B01D 2253/108* (2013.01); *B01F 2101/305* (2022.01); *C02F 2103/08* (2013.01)

(58) Field of Classification Search
CPC ........ C02F 1/04–18; B01D 61/36–368; B01D 61/42–56
See application file for complete search history.

(56) References Cited

U.S. PATENT DOCUMENTS 3,367,787 A * 2/1968 Paardekooper .......... B01D 1/00
159/13.4
5,346,535 A 9/1994 Kuznicki et al.
(Continued)

OTHER PUBLICATIONS

Ashutosh Agarwal, Wun Jern Ng, Yu Liu, Principle and applications of microbubble and nanobubble technology for water treatment, Chemosphere, vol. 84, Issue 9, 2011, pp. 1175-1180, https://doi.org/10.1016/j.chemosphere.2011.05.054. (Year: 2011).*

(Continued)

*Primary Examiner* — Jonathan Luke Pilcher
(74) *Attorney, Agent, or Firm* — LeonardPatel PC; Michael A. Leonard, II; Sheetal S. Patel (57) ABSTRACT

Rapid evaporation of water for desalination and dewatering using nanobubbles and micro-droplets is disclosed. Warm nanobubbles of air are injected into seawater or another water source to be treated, and the normal stasis of the nanobubbles is disrupted with ultrasonic energy. The nanobubbles implode and violently recombine into microbubbles. Energized by the effects of the nanobubble state change, these energetic, relatively high surface area microbubbles bubbles quickly rise to the surface of the water, creating an aerosol of micro-water droplets above the surface that is drawn into a dry, warm stream of air and rapidly evaporates, precipitating out salt crystals. The air is then cooled with a chiller, condensing the moisture in the air into fresh water.

20 Claims, 4 Drawing Sheets

(51) Int. Cl.
   *B01F 23/231*   (2022.01)
   *B01F 31/80*   (2022.01)
   *C02F 103/08*   (2006.01)
   *B01F 101/00*   (2022.01)

(56) References Cited

U.S. PATENT DOCUMENTS

| | | |
|---|---|---|
| 9,115,937 B2 | 8/2015 | Perryman |
| 9,470,148 B2 | 10/2016 | Perryman, Jr. |
| 10,119,728 B2 | 11/2018 | Perryman, Jr. |
| 11,007,287 B2 * | 5/2021 | Qamar ............... B08B 3/12 |
| 2006/0054205 A1 * | 3/2006 | Yabe ............... A61L 9/012 |
| | | 134/1 |
| 2019/0358352 A1 * | 11/2019 | Qamar ............ B01D 65/08 |
| 2021/0229106 A1 * | 7/2021 | Meegoda ............ B02C 19/18 |

OTHER PUBLICATIONS

Lianbin Zhang et al., "A self-cleaning underwater superoleophobic mesh for oil-water separation," Sci Rep 3, 2326 (2013).

Spintek.com Porous Metal Design Guidebook available at http://spintek.com/wp-content/uploads/2013/05/porous_metal_membrane_guide_spintek.pdf (last accessed Nov. 2, 2020).

WALPA Nanobubble Article available at https://www.walpa.org/waterline/december-2020/small-bubbles-big-impact-nanobubbles-for-effective-deep-water-oxygenation-and-algae-control/ (last accessed Nov. 3, 2021).

* cited by examiner

```
START
  ↓
310 — Perform Coarse Filtration on Geothermal Brine
  ↓
320 — Perform Nanobubble-Assisted Electrodialysis  ←┐
  ↓                                                  │ Continuously
330 — Generate Nanobubble and Ultrasonic Aerosol    │ Perform
       from Brine  ─────────────────────────────────┘ Electrodialysis
  ↓                                                    on Brine
340 — Filter Aerosol
  ↓
350 — Process and Dry Concentrated Brine
  ↓
360 — Collect Desired Material(s)
  ↓
END
```

START

410 — Obtain or Generate Thermal Energy

420 — Store Thermal Energy in Thermal Energy Storage

430 — Create Nanobubbles in Saltwater

440 — Subject Nanobubbles to Acoustic Energy and Generate Mist

450 — Filter Mist through Membrane

460 — Induce Forced Evaporation of Mist

470 — Precipitate and Collect Fresh Water via Chiller

END

RAPID EVAPORATION OF WATER FOR DESALINATION AND DEWATERING USING NANOBUBBLES AND MICRO-DROPLETS

CROSS-REFERENCE TO RELATED APPLICATION

This application claims the benefit of U.S. Provisional Patent Application No. 63/108,931 filed Nov. 3, 2020. The subject matter of this earlier filed application is hereby incorporated by reference in its entirety.

FIELD

The present invention generally relates to water desalination, and more particularly, to rapid evaporation of water for desalination and dewatering using nanobubbles and micro-droplets.

BACKGROUND

Water desalination is a process that takes away mineral components from saline water (e.g., seawater). Such saltwater can be desalinated to produce water suitable for human consumption or irrigation. Due to its energy consumption, desalinating seawater is generally more costly than obtaining fresh water from surface water or groundwater, water recycling, and water conservation.

Various desalination techniques exist, including membrane-based and thermal-based techniques. Solar distillation mimics the natural water cycle, in which the sun heats the seawater enough for evaporation to occur. After evaporation, the water vapor is condensed onto a cool surface. There are two types of solar desalination: (1) using photovoltaic cells (typically for reverse osmosis) that convert solar energy to electrical energy to power the desalination process; and (2) using solar energy to produce heat for evaporating water (i.e., solar-thermal desalination). Some other forms use natural evaporation desalination, vacuum distillation desalination, multi-stage flash distillation desalination, multiple-effect distillation desalination, vapor-compression distillation desalination, reverse osmosis desalination, freeze-thaw desalination, electrodialysis membrane desalination, membrane distillation desalination, forward osmosis desalination, or wave-powered desalination.

However, conventional desalination techniques tend to be relatively expensive and/or yield a relatively small amount of fresh water. Accordingly, an improved approach may be beneficial.

SUMMARY

Certain embodiments of the present invention may provide solutions to the problems and needs in the art that have not yet been fully identified, appreciated, or solved by conventional water desalination technologies. For example, some embodiments of the present invention pertain to rapid evaporation of water for desalination and dewatering using nanobubbles and micro-droplets.

In an embodiment, a method includes generating nanobubbles in water using one or more nanobubble generators. The method also includes subjecting the nanobubbles to acoustic energy configured to trigger explosive collapse of the nanobubbles and produce larger microbubbles of air that rise to a surface of the water and generate a rising water mist comprising micro-droplets of the water. The method further includes filtering the rising water mist through a membrane and evaporating the filtered water mist using a heated airflow.

In another embodiment, a method includes generating nanobubbles in water of a vaporizer using one or more nanobubble generators. The method also includes subjecting the nanobubbles, by the vaporizer, to acoustic energy configured to trigger explosive collapse of the nanobubbles and produce larger microbubbles of air that rise to a surface of the water and generate a rising water mist comprising micro-droplets of the water. The method further includes filtering the rising mist through a negatively charged molecular sieve and filtering the rising water mist through a membrane after the rising mist passes through the negatively charged molecular sieve. Additionally, the method includes evaporating the filtered water mist that passed through the membrane using a heated airflow in an air saturator and cooling the evaporated water using a chiller to precipitate pure water from the evaporated water.

In yet another embodiment, a method includes generating nanobubbles in water of a vaporizer using one or more nanobubble generators. The generated nanobubbles are at a temperature of between 50 to 60 degrees Celsius. The method also includes subjecting the nanobubbles, by the vaporizer, to acoustic energy configured to trigger explosive collapse of the nanobubbles and produce larger microbubbles of air that rise to a surface of the water and generate a rising water mist comprising micro-droplets of the water. The method further includes filtering the rising mist through a negatively charged molecular sieve and filtering the rising water mist through a membrane after the rising mist passes through the negatively charged molecular sieve. The negatively charged molecular sieve includes one or more ultrasonic plates that cause dry particulates in the vaporizer to precipitate. Additionally, the method comprises evaporating the filtered water mist that passed through the membrane using a heated airflow at between 40 and 60 degrees Celsius in an air saturator and cooling the evaporated water using a chiller to precipitate pure water from the evaporated water.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to rapid evaporation of water for desalination and dewatering using nanobubbles and micro-droplets. Some embodiments inject warm nanobubbles of air into seawater or another water source to be treated. The normal stasis of the nanobubbles is disrupted with ultrasonic energy. The nanobubbles implode and violently recombine into microbubbles. Energized by the effects of the nanobubble state change, these energetic, relatively high surface area microbubbles quickly rise to the surface of the water, creating an aerosol of micro-water droplets above the surface.

This aerosol is drawn into a dry, warm stream of air and rapidly evaporates, precipitating out salt crystals (if seawater is the source) and other particulates. The air is then cooled (e.g., with a thermoacoustic chiller), condensing the moisture in the air into fresh water. In some embodiments, these effects accelerate the evaporation process approximately one thousand times and reduce the specific energy by 1-2 orders of magnitude as compared to conventional techniques.

Some embodiments employ a four-stage process. In the first stage, heat may be provided by a full spectrum solar thermal collector and the energy therefrom may be stored in a thermal storage system. See, e.g., U.S. Pat. Nos. 10,119,728, 9,115,937, and 9,470,148. However, any suitable energy source without deviating from the scope of the invention. In the second stage, water micro-droplets and seawater aerosol may be generated. Nanobubbles of air may be created using a commercially available nanobubble generation system. Warm (e.g., 50-60° C.) nanobubbles of air are stable in seawater within a wide range of conditions. This is a relatively low temperature compared to other desalination processes, which has the advantages of reducing the energy consumption and avoiding many forms of contamination. It has been shown that it is possible to trigger the explosive collapse of these nanobubbles, which simultaneously produce larger microbubbles of air and then micro-droplets of water after the microbubbles rise to the surface and burst. The pressure and buoyancy of the air bubbles drives the water droplets to the water surface where they breach the surface, forming a buoyant seawater mist that will continue rising. The mist rises through an easily permeable metal molecular filter (e.g., a molecular sieve and a metal filter), for example, that removes plastics, organics (e.g., petroleum and petroleum-derived products), etc.

In the third stage, forced rapid evaporation is induced. Hot, dry, high-velocity horizontal airflow is provided that serves two purposes. First, it provides suction on the mist rising from the molecular filter to help the aerosol become entrained into the airflow. Second, aided by large surface area of the micro-bubbles and condition of the airflow, the droplets are nearly instantly evaporated, with salts falling into a catch pan or some other collecting component in crystal form if salt is contained in the water. Other particulates may also be captured in this manner. This process yields pure water with no volatiles, micro-plastics, or difficult to remove organic and inorganic contaminants.

When the water evaporates, a chilling effect occurs. In some embodiments, this cooling effect is used to deliver chilled coolant to chill the intake air from the outside to a point that the moisture in the intake air is cool enough such that water in this air will be condensed. This further dries the intake air before warming the intake air enough thereafter to affect the evaporation with an airstream of warm, dry air. The condensate is channeled into the intake water that will be processed by the system. This has been integrated into a prototype system and this approach greatly enhances the rate of evaporation with a small increase of thermal energy needed to warm the airstream to between 40-60° C. to promote rapid evaporation.

In the fourth stage, a chiller (e.g., a thermo-acoustic chiller driven by thermal energy) is used to quickly and efficiently precipitate pure water. Some embodiments may exceed production of 500 cubic meters ($m^3$) of fresh water per day. The cost of some embodiments may be $0.22 per $m^3$ or less. Compared to distillation and reverse osmosis (RO), the generation and evaporation of microbubbles of water along with condensation water are quite low energy, mild condition processes that can cause highly energetic evaporation of seawater, operating with a low electric load, low temperature excursions, and at near atmospheric pressure.

Some embodiments may be employed for other applications besides desalination. For instance, the process of FIG. 4 and that described above may be applied to evaporating water from agricultural and municipal wastewater, evaporating water from contaminated municipal water supplies, recovering mineral salts for mining (e.g., lithium salts and rare earth metals that may be volatilized by high temperature drying), etc. The only essential change in some embodiments may be replacing the saltwater with the water source of interest.

Figure 1:
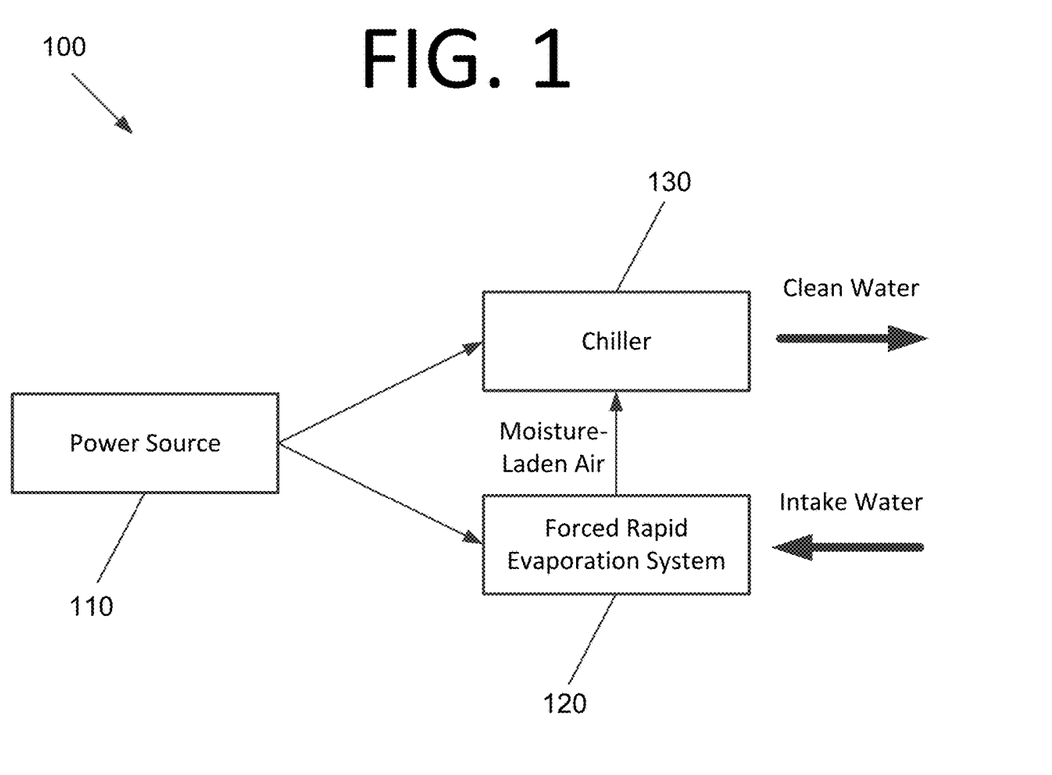
FIG. 1 is an architectural diagram illustrating a desalination and dewatering system, according to an embodiment of the present invention.

FIG. 1 is an architectural diagram illustrating a desalination and dewatering system 100, according to an embodiment of the present invention. System 100 includes a power source 110 that supplies power to a forced rapid evaporation system 120 and a chiller 130. The power source may be any suitable power source without deviating from the scope of the invention, such as a grid power source, a thermal energy storage and power generation source (which may also supply heat), a mobile heat pipe cooled reactor, a solar and/or wind power source, etc.

Forced rapid evaporation system 120 uses warm, dry air to evaporate pure water from a rising mist of sea water or other intake water (e.g., from a lake, stream, municipal water supply, sewage, well water, etc.). The rising mist is generated by nanobubbles of air that are applied to the intake water within forced rapid evaporation system 120. Moisture-laden air containing the evaporated water is supplied from forced rapid evaporation system 120 to a chiller 130, which cools the moisture-laden air, causing the evaporated water to condense. This pure water is collected by chiller 130 and supplied for use by a municipality, an industrial process, to be collected and sold as laboratory grade pure water, etc. In some embodiments, chiller 130 is a solid state absorption chiller, such as a sound energy chiller. However, any suitable chiller may be used without deviating from the scope of the invention, such as coolant-based chillers that use a refrigerant, a cold water or air source, etc.

Figure 2:
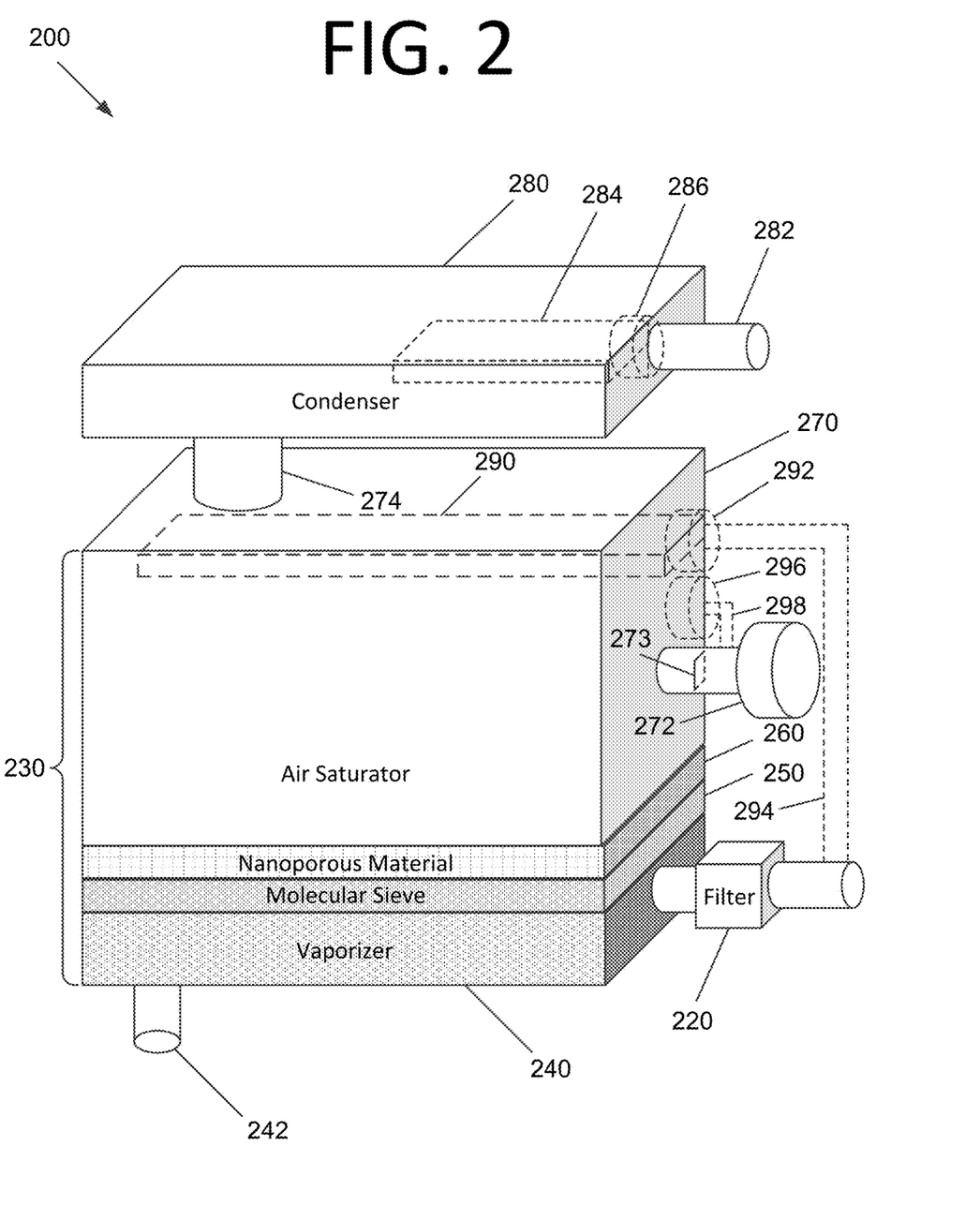
FIG. 2 is an architectural diagram illustrating a forced rapid evaporation and condensation system, according to an embodiment of the present invention.

FIG. 2 is an architectural diagram illustrating a forced rapid evaporation and condensation system 200, according to an embodiment of the present invention. It should be noted that the elements of FIG. 2A are not necessarily to scale both individually and collectively. In some embodiments, forced rapid evaporation system (230) is forced rapid evaporation system 120 of FIG. 1 and the condensation component (270) is chiller 130 of FIG. 1. An intake pipe 210 provides intake water from a water source (not shown) to a filter 220, which filters non-soluble materials and debris from the intake water. The filtered water is then provided to a vaporizer 240 of forced rapid evaporation system 230. Vaporizer 240 is a tank with at least one nanobubble generator that creates warm (e.g., 50-60° C.) nanobubbles (e.g., 1-100 nm) of air in the intake water and subjects them to acoustic energy. This triggers the explosive collapse of the nanobubbles and simultaneously produces larger microbubbles of air, and then micro-droplets of water after the microbubbles rise to the surface due to their pressure and buoyancy and burst, generating a saltwater mist of nano-droplets and micro-droplets. The nanobubble generator in some embodiments may be a commercially available nanobubble generator, such as the Neo™ generator by Moleaer®.

In some embodiments, vaporizer 240 is essentially a sealed chamber that destroys most microorganisms by super-oxygenating the water via the nanobubble generator(s). The nanobubble generator(s) reduce the surface tension of the water (e.g., to below 72 dynes/centimeter in some embodiments), allowing a greater volume of nano-droplets to be generated providing pressure that forces the nano-droplets into molecular sieve 250. In certain embodiments, an ultrasonic atomizing transducer is also employed by vaporizer 240 to increase the vapor volume and the potential amount of potable water that is eventually delivered. Waste water from vaporizer 240 may be provided to evaporation ponds, for mineral harvesting, etc., by return pipe 242.

The rising mist is then filtered through a molecular sieve 250. Molecular sieve 250 may be negatively charged and take advantage of the Venturi effect, drawing high energy, high surface area, low mass mist through itself and removing micro and volatile contaminates in the process. A molecular sieve is a material with pores of uniform size that are similar in size to small molecules. Thus, large molecules cannot pass through molecular sieve 250 but small molecules can, removing most materials with the exception of dissolved salts. The molecular sieve may be made from materials such as zeolites (microporous aluminosilicate minerals), charcoal, carbon nanotube unwoven mats, and various other substances depending on targeted impurities that should be prefiltered before evaporation. Target materials may include petroleum products, various organic and inorganic volatiles, volatized metals (e.g., mercury), etc. Yellow cake and other low level radioactive microparticles may also be removed in some embodiments.

More than one molecular sieve can be utilized in stages to remove various contaminants. The molecular sieves can be charged where they act in a similar fashion as electrodialysis membrane targeting specific impurities that may be found in various water sources.

The rising mist then passes through a nanoporous material 260 that further purifies the rising mist, such as a superoleophobic mesh that can remove hydrocarbons, which can evaporate at under 100° C. (see, for example, Lianbin Zhang et al., "A self-cleaning underwater superoleophobic mesh for oil-water separation," Sci Rep 3, 2326 (2013)), a porous metal mesh sintered with sizes of 1 micrometer (μm) or less (small salt crystals are usually 1.5 μm or larger), a modular sieve (see, for example, U.S. Pat. No. 5,346,535), two or more layers of noncorroding, water-absorbent nanoporous metal paper, etc. In the case of nanoporous metal paper, the lowest layer may be heated to ~70° C. in some embodiments to heat the water vapor and to accelerate the evaporation of water from the nano-droplets. The small salt crystals (if salt is present) fall out of the air and collect on such porous membranes, and the small salt crystals can then be readily harvested. Nanoporous material 260 thus serves as the dispersal surface for water vapor.

In some embodiments, ultrasonic plates in molecular sieve 250 are used to generate ultrasonic vibrations on at least a portion of the surface area of molecular sieve 250 and nanoporous material 260. This causes dry particulates to continuously precipitate back into the bottom of vaporizer 240. These particulates can then be carried off with discharge water. The ultrasonic plates incorporated into molecular sieve 250 may reduce or eliminate clogging of the pores of molecular sieve 250, and may be located adjacent to layers of a porous metal mesh for this purpose. This reduces periodic cleaning and replacement requirements.

The rising mist then enters a portion of forced rapid evaporation system 230 called an air saturator 270 herein. A blower 272 provides hot, dry horizontal air into air saturator 270. This air collects water vapor from the mist, and moisture-laden air is provided via a duct 274 to condenser 280, which is chiller 130 of FIG. 1 in some embodiments. Condenser 280 then provides condensed water from the moisture-laden air via a clean water pipe 282. This water may be collected in a reservoir 284 in some embodiments before being pumped out by a pump 286 in some embodiments.

The evaporation of the water in air saturator 270 causes a chilling effect, cooling the air to the point where the water will condense. The condensation may be collected in a reservoir 290 in some embodiments (e.g., a tray, a trough, etc.), and the cooler condensed water may then be pumped by a pump 292 through a pipe 294 into intake pipe 210. The cooler air itself can also be reused via a fan 296 that delivers the cooler air using a duct 298 to mix with the intake air. This may help to cool the intake air to the point that the intake air is cool enough that water in this air will be condensed. This further dries the intake air before warming the intake air enough thereafter via a heater 273 to affect the evaporation.

As discussed above, various materials can be harvested from the water during the evaporation process, such as salts from seawater, lithium carbonate and/or other minerals from well water, methane from sewage, etc. These materials may collect on, and be removed from, nanoporous material 260 in some embodiments. In certain embodiments, geothermal brine materials, such as lithium carbonate, may be captured.

FIG. 3 is a flowchart illustrating a process 300 for capturing minerals and salts from a geothermal brine, according to an embodiment of the present invention. The process begins with performing coarse filtering on the geothermal brine at 310 to remove non-soluble materials and to increase the viscosity of the brine. Nanobubble-assisted electrodialysis is then performed at 320. This separates processed water from the brine, which is rejected and concentrated. The electrodialysis that is employed may be monovalent electrodialysis (mEDR) in some embodiments, which chlorides are removed at high recovery with minimal pre-treatment. The mEDR may include alternating monovalent anion exchange membranes (mAEMs) and cation exchange membranes (CEMs). The mAEMs block sulphates and pass chlorides. Organics do not transit or foul the membranes. Such a process can remove 99% or more of the chlorides in the brine in some embodiments.

After electrodialysis at 320, a nanobubble and ultrasonic aerosol is generate from the brine at 330. This may be performed by a similar system to system 200 of FIG. 2 in some embodiments. Indeed, fresh water from this process may be used for drinking water, agriculture, etc. The aerosol rises through a filter at 340, such as carbon nanotube (CNT)

non-woven filter mats, which remove the remaining salts and other water soluble materials.

Figure 3:
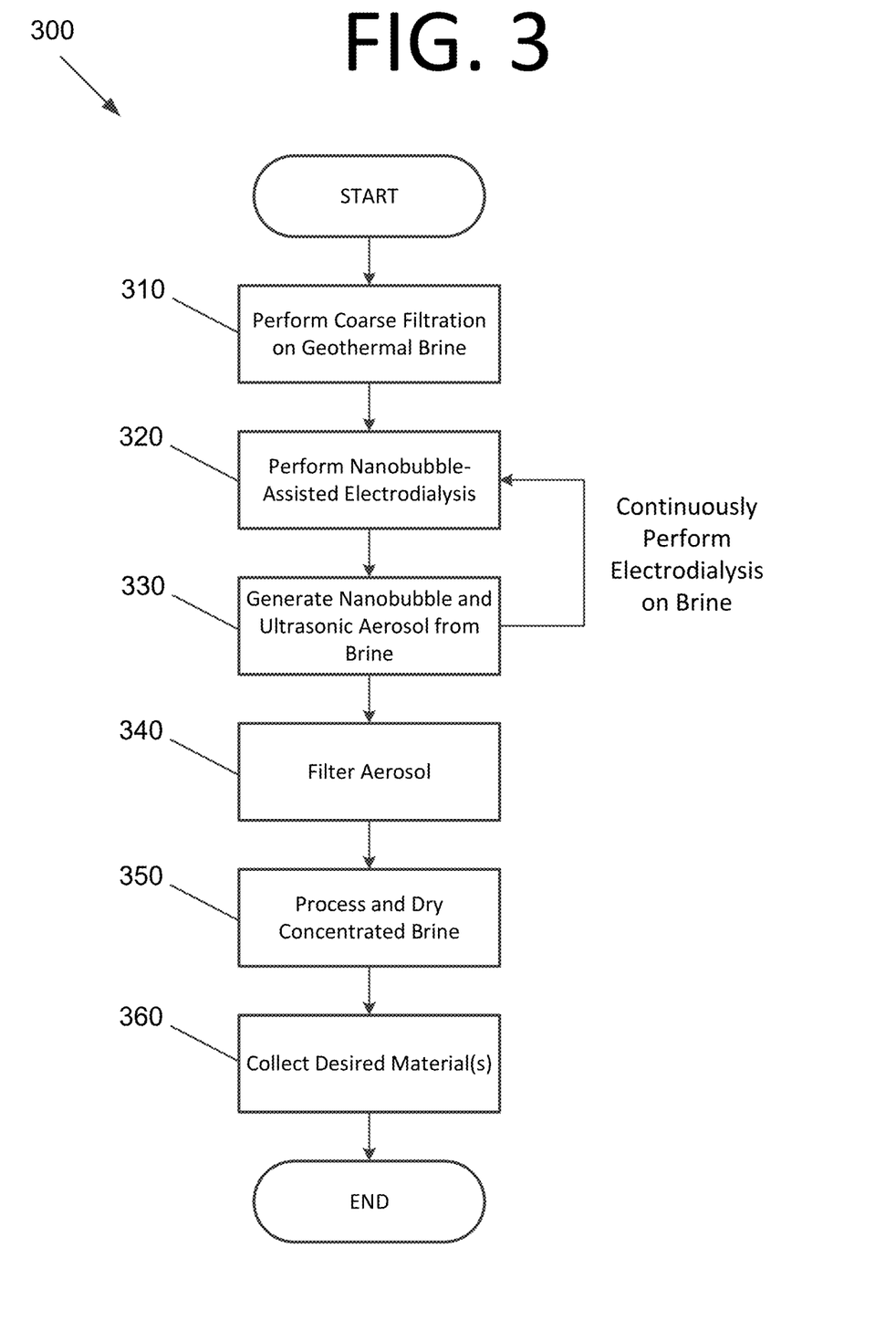
FIG. 3 is a flowchart illustrating a process for capturing minerals and salts from a geothermal brine, according to an embodiment of the present invention.

The brine becomes more and more viscous as water is filtered out at 340. The concentrated brine is then processed and dried at 350 after a desired amount of water has been removed, after a desired viscosity is reached, after an amount of time, etc. The processing and drying may include performing ultrasonic agitation on precipitants, drying the concentrated brine using dryers, using a centrifuge on the concentrated brine and/or the dried material from the drier, etc. In the case of $Li_2CO_3$, for example, various combinations with magnesium, phosphate, and calcium may also be present. Ultrasonic agitation may be employed, the temperature may be increased to ~95° C., and $Na_2CO_3$ may be added to help separate the $Li_2CO_3$. Desired material(s) can then be collected at 360.

Figure 4:
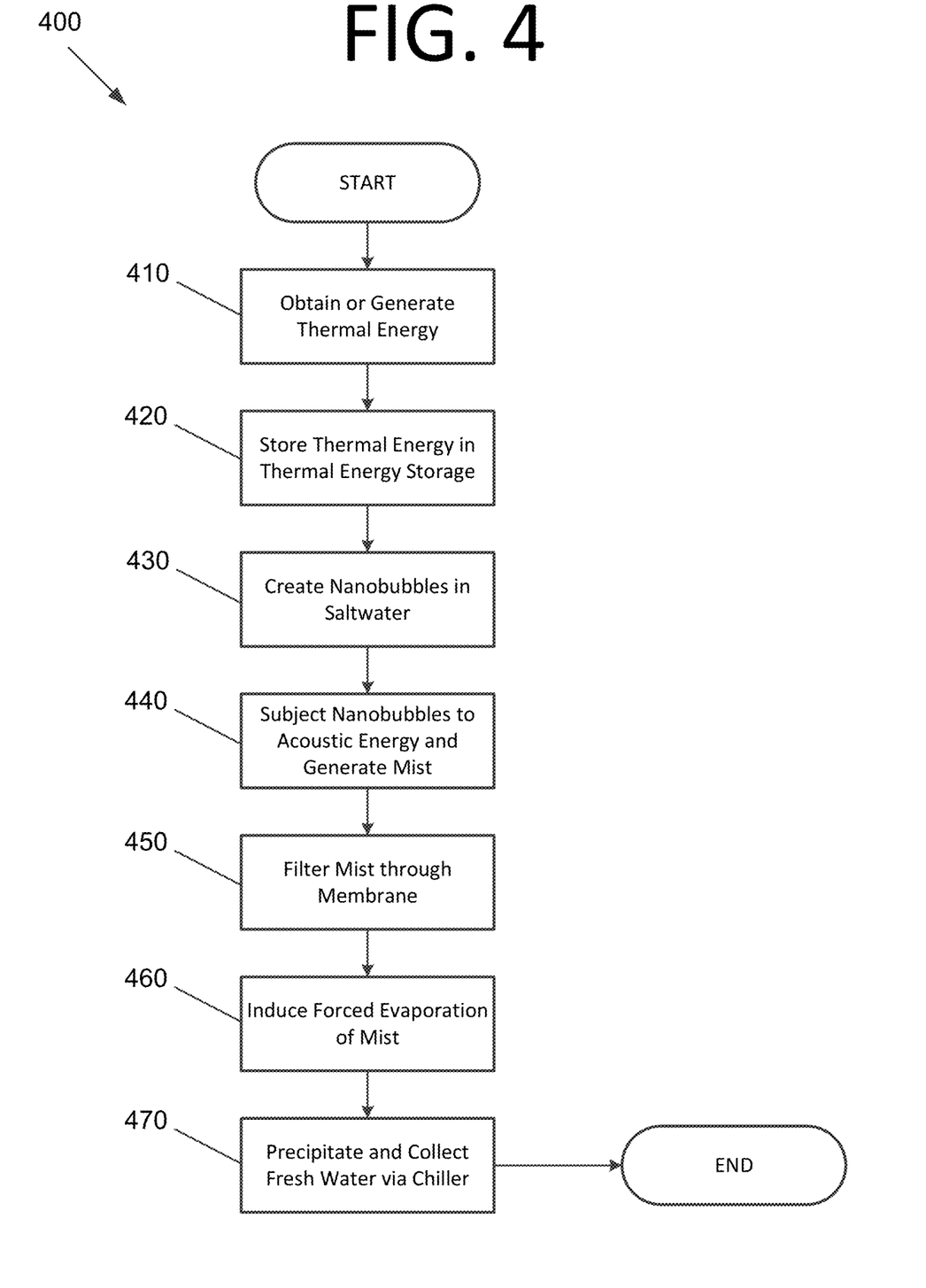
FIG. 4 is a flowchart illustrating a process for performing rapid evaporation of water for desalination and dewatering using nanobubbles and micro-droplets, according to an embodiment of the present invention.

FIG. 4 is a flowchart illustrating a process 400 for performing rapid evaporation of water for desalination and dewatering using nanobubbles and micro-droplets, according to an embodiment of the present invention. The process begins with obtaining or generating heat energy (e.g., via a solar thermal collector) at 410 and storing the collected heat energy in a thermal storage system at 420. Using this stored energy, a nanobubble generator is powered to create warm (e.g., 50-60° C.) nanobubbles of air in saltwater (or other water to be treated) at 430. The nanobubbles are subjected to acoustic energy at 440, which triggers the explosive collapse of the nanobubbles and simultaneously produces larger microbubbles of air, and then micro-droplets of water after the microbubbles rise to the surface due to their pressure and buoyancy and burst, generating a saltwater mist.

The rising mist is then filtered through a membrane at 450. In some embodiments, the membrane is a permanent metal membrane, such as a superoleophobic mesh that can remove hydrocarbons, which can evaporate at under 100° C., a porous metal mesh sintered with sizes of 1 μm or less, a modular sieve, etc. The small salt crystals (if seawater is being filtered) fall out of the air and collect on such porous membranes, and the small salt crystals can then be readily harvested.

Forced rapid evaporation is induced in the mist after it passes through the membrane at 460 via hot, dry, high-velocity horizontal airflow, for example. A chiller is then used at 470 to quickly and efficiently precipitate pure water from the evaporated water.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In an embodiment, a method includes generating nanobubbles in saltwater (or other water to be treated) using a nanobubble generator. In some embodiments, the nanobubbles may be between 50-60° C. In certain embodiments, the nanobubble generator may be powered by stored thermal energy obtained or generated via a solar thermal collector.

The method also includes subjecting the nanobubbles to acoustic energy, triggering explosive collapse of the nanobubbles and simultaneously producing larger microbubbles of air, which rise to a surface of the saltwater and generate a rising saltwater mist comprising micro-droplets of the saltwater. The method further includes filtering the rising saltwater mist through a membrane and rapidly evaporating the filtered water mist using an airflow. Additionally, the method includes using a chiller to precipitate pure water from the evaporated water in the airflow.

The invention claimed is:

1. A method, comprising:
   generating nanobubbles in water using one or more nanobubble generators;
   subjecting the nanobubbles to acoustic energy configured to trigger explosive collapse of the nanobubbles and produce larger microbubbles of air that rise to a surface of the water and generate a rising water mist comprising micro-droplets of the water;
   filtering the rising water mist through a membrane to generate a filtered water mist; and
   evaporating the filtered water mist using a heated airflow.

2. The method of claim 1, further comprising:
   cooling the evaporated water to precipitate pure water from the evaporated water.

3. The method of claim 1, wherein the nanobubbles are at a temperature of between 50 and 60 degrees Celsius.

4. The method of claim 1, wherein air of the heated airflow is between 40 and 60 degrees Celsius.

5. The method of claim 1, wherein the filtering of the rising water mist comprises filtering the rising water mist through a negatively charged molecular sieve.

6. The method of claim 5, wherein the molecular sieve comprises a microporous aluminosilicate, charcoal, or at least one carbon nanotube non-woven filter mat.

7. The method of claim 5, wherein the negatively charged molecular sieve comprises one or more ultrasonic plates that cause dry particulates to precipitate.

8. The method of claim 1, wherein the membrane comprises a superoleophobic mesh, a porous metal mesh sintered with sizes of 1 micrometer or less, a modular sieve, or two or more layers of noncorroding, water-absorbent nanoporous metal paper.

9. The method of claim 1, wherein the membrane comprises at least two layers of noncorroding, water-absorbent nanoporous metal paper and the method further comprises:
heating a lowest layer of the at least two layers of noncorroding, water-absorbent nanoporous metal paper to at least 70° C., thereby heating the rising water mist to heat nano-droplets of the rising water mist and accelerate evaporation of the nano-droplets.

10. The method of claim 1, further comprising:
collecting water that condenses from the filtered water mist; and
supplying the collected water to a vaporizer comprising the one or more nanobubble generators.

11. The method of claim 1, further comprising:
supplying cooled air from the evaporation of the filtered water mist to an air supply that is supplied to the heated airflow prior to heating.

12. A method, comprising:
generating nanobubbles in water of a vaporizer using one or more nanobubble generators;
subjecting the nanobubbles to acoustic energy configured to trigger explosive collapse of the nanobubbles and produce larger microbubbles of air that rise to a surface of the water and generate a rising water mist comprising micro-droplets of the water;
filtering the rising water mist through a negatively charged molecular sieve to generate a filtered water mist;
filtering the rising water mist through a membrane after the rising water mist passes through the negatively charged molecular sieve;
evaporating the filtered water mist using a heated airflow in an air saturator; and
cooling the evaporated water using a chiller to precipitate pure water from the evaporated water.

13. The method of claim 12, wherein the nanobubbles are at a temperature of between 50 and 60 degrees Celsius.

14. The method of claim 12, wherein air of the heated airflow is between 40 and 60 degrees Celsius.

15. The method of claim 12, wherein the negatively charged molecular sieve comprises one or more ultrasonic plates that cause dry particulates in the vaporizer to precipitate.

16. The method of claim 12, wherein the membrane comprises at least two layers of noncorroding, water-absorbent nanoporous metal paper and the method further comprises:
heating a lowest layer of the at least two layers of noncorroding, water-absorbent nanoporous metal paper to at least 70° C., thereby heating the rising water mist to heat nano-droplets of the rising water mist and accelerate evaporation of the nano-droplets.

17. The method of claim 12, further comprising:
collecting water that condenses from the filtered water mist in a reservoir; and
supplying the collected water to the vaporizer.

18. The method of claim 12, further comprising:
supplying cooled air from the evaporation of the filtered water mist in the air saturator to an air supply that is supplied to the heated airflow prior to heating by a heater.

19. A method, comprising:
generating nanobubbles in water of a vaporizer using one or more nanobubble generators, the generated nanobubbles at a temperature of between 50 and 60 degrees Celsius;
subjecting the nanobubbles to acoustic energy configured to trigger explosive collapse of the nanobubbles and produce larger microbubbles of air that rise to a surface of the water and generate a rising water mist comprising micro-droplets of the water;
filtering the rising water mist through a negatively charged molecular sieve;
filtering the rising water mist through a membrane to generate a filtered water mist after the rising water mist passes through the negatively charged molecular sieve, wherein the negatively charged molecular sieve comprises one or more ultrasonic plates that cause dry particulates in the vaporizer to precipitate;
evaporating the filtered water mist using a heated airflow at between 40 and 60 degrees Celsius in an air saturator; and
cooling the evaporated water using a chiller to precipitate pure water from the evaporated water.

20. The method of claim 19, wherein the membrane comprises at least two layers of noncorroding, water-absorbent nanoporous metal paper and the method further comprises:
heating a lowest layer of the at least two layers of noncorroding, water-absorbent nanoporous metal paper to at least 70° C., thereby heating the rising water mist to heat nano-droplets of the rising water mist and accelerate evaporation of the nano-droplets.

* * * * *